Aug. 25, 1953 P. R. POWELL 2,649,867
APPARATUS FOR ADVANCING FILAMENTARY ARTICLES
Filed Feb. 21, 1949 6 Sheets-Sheet 6

INVENTOR
P. R. POWELL
BY
ATTORNEY

Patented Aug. 25, 1953

2,649,867

UNITED STATES PATENT OFFICE 2,649,867

APPARATUS FOR ADVANCING
FILAMENTARY ARTICLES

Paul R. Powell, Baltimore, Md., assignor to Western Electric Company, Incorporated, New York, N. Y., a corporation of New York Application February 21, 1949, Serial No. 77,547

2 Claims. (Cl. 140—129)

This invention relates to apparatus for advancing filamentary articles, and more particularly to apparatus for advancing portions of a filamentary article, such as an insulated conductor.

In processing some type of filamentary articles, it is advantageous to advance such an article continuously from a storage device, such as, for example, a reel, so that the advancement of the article need not be subjected to the strains concomitant to stopping and starting the article. In the past, there has been no apparatus serving to advance a filamentary article continuously from a storage device while periodically holding portions of the article advanced from the storage stationary so that stationary article-processing elements could be used in performing work on the article.

An object of the invention is to provide new and improved apparatus for advancing filamentary articles.

A further object of the invention is to provide new and improved apparatus for advancing portions of a filamentary article, such as an insulated conductor.

An apparatus illustrating certain features of the invention may include means for supplying a filamentary article, means spaced from the article-supplying means for advancing the filamentary article continuously, a pair of article-deflecting means positioned apart and between the article-supplying means and the article-advancing means for storing portions of the article individually, and means for actuating the article-deflecting means in a manner such that one of the pair gives up at least a portion of the length of the article stored thereby and the second article-deflecting means takes up at least a portion of the length of article given up by the other article-deflecting means, whereby the rate of speed of the portion of the article between the article-deflecting means is controlled.

A complete understanding of the invention may be obtained from the following detailed description of an apparatus forming a specific embodiment thereof, when read in conjunction with the appended drawings, in which.

Figure 1:
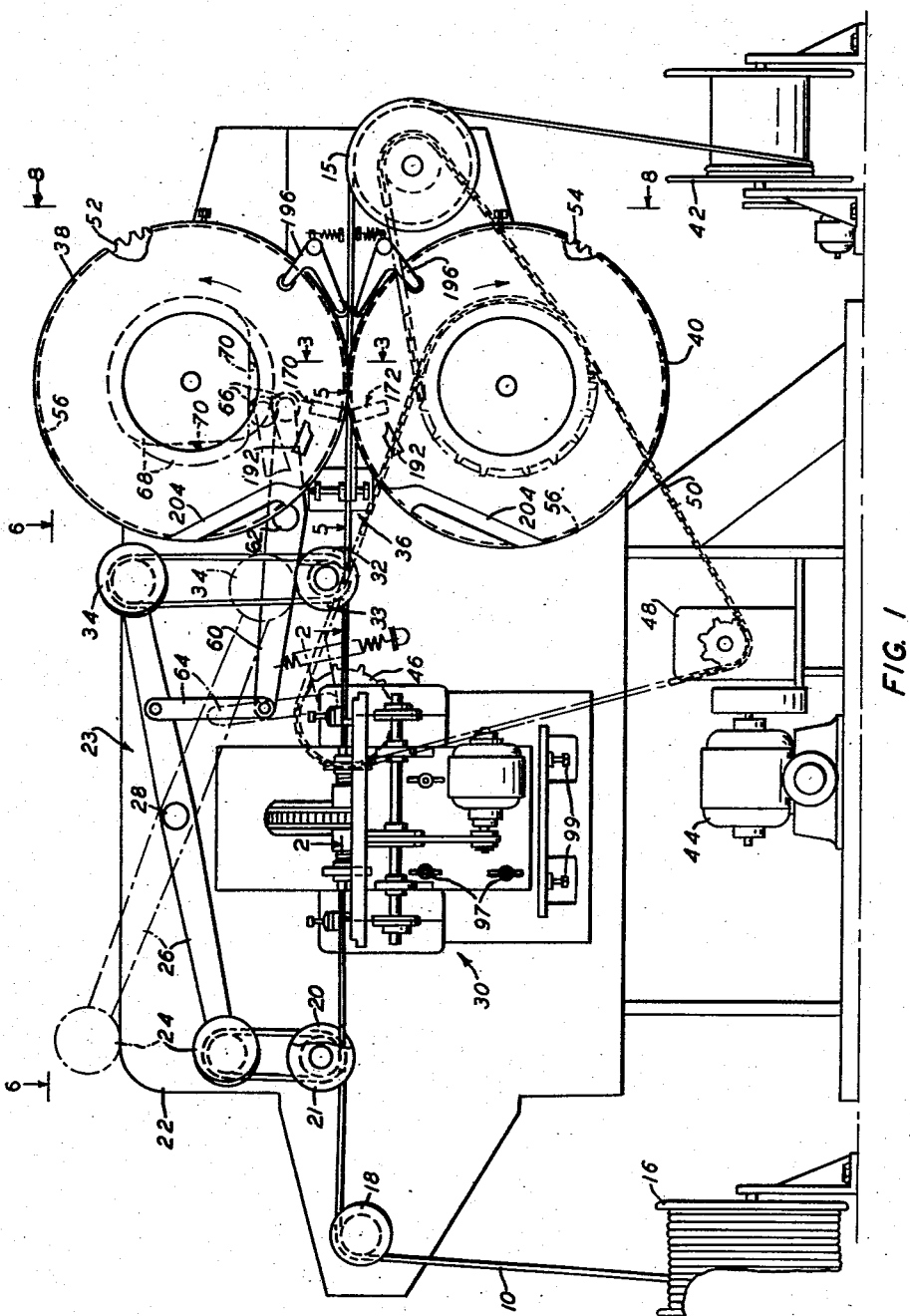
Fig. 1 is a front, elevational view of an apparatus forming one embodiment of the invention with portions thereof broken away.
Figure 2:
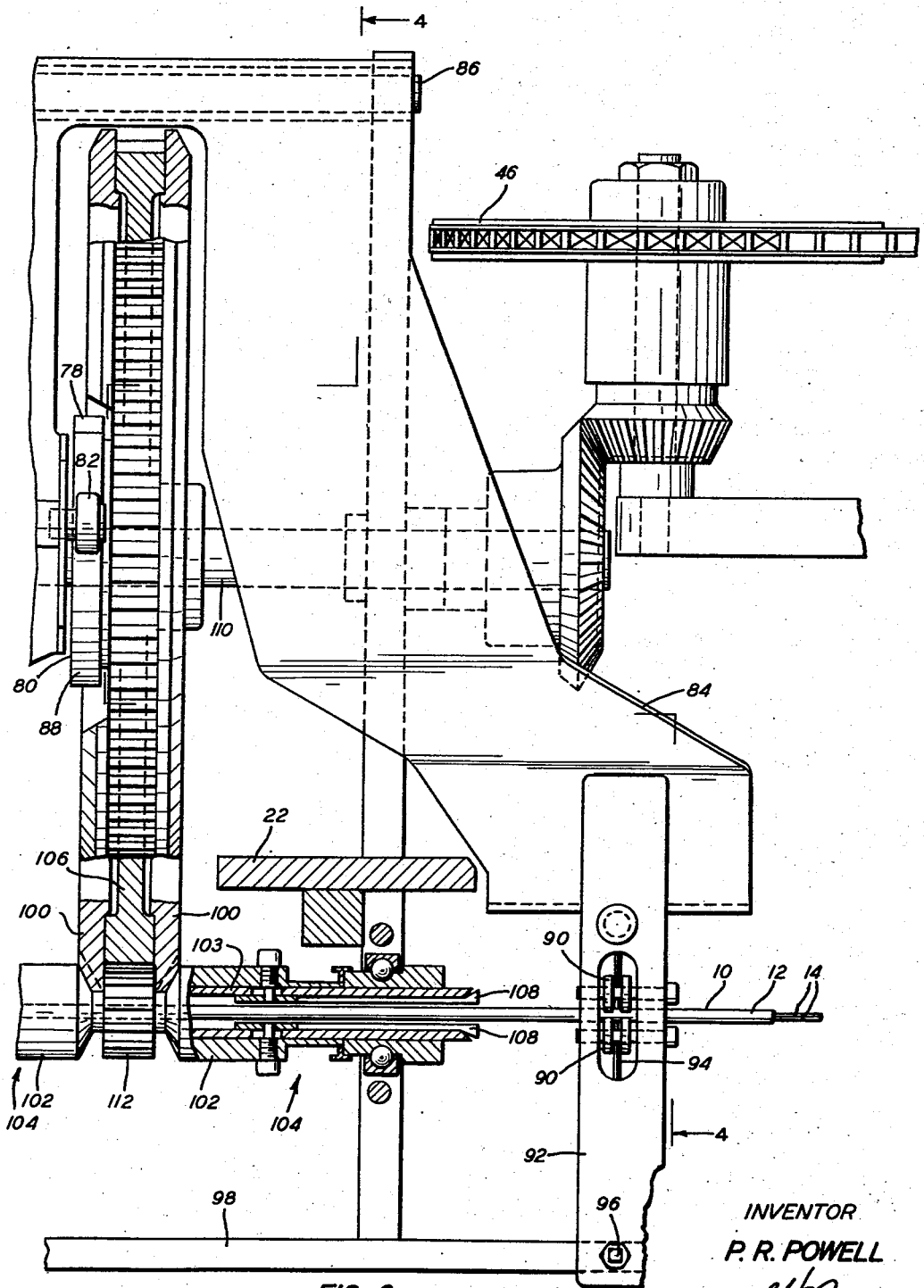
Fig. 2 is an enlarged, horizontal section taken along line 2—2 of Fig. 1.

Referring now in detail to the drawings, there is shown therein a device for continuously advancing cordage 10 along portions of a path and for periodically holding portions of the cordage stationary along other portions of the path so that these portions of the cordage may be processed. This device is disclosed with cordage processing devices, which are illustrative only insofar as the present invention is concerned. The cordage 10 (Figs. 1 and 2) including a jacket 12 and individually insulated conductors 14—14 is advanced continuously at a constant rate of speed by a capstan 15 from a supply reel 16, over a guide pulley 18 to individually rotatable, grooved sheaves 20 and 21 mounted rotatably on a fixed plate 22 and forming a portion of a walking beam storage device 23. The cordage extends in one complete loop around the sheaves 20 and 21 and a sheave 24 mounted rotatably on a lever 26 pivoted at the midpoint thereof on a pin 28 fixed to the plate 22, and travels through a ring cutter 30 mounted on the plate to one of individually rotatable, grooved sheaves 32 and 33 mounted rotatably on the plate. The cordage extends in one complete loop around the sheave 32, a grooved sheave 34 carried by the lever 26 and the sheave 33, and goes from the sheave 33 to and through a slitter 36 and between stripping discs 38 and 40 to the capstan 15 from which it is taken up by a separately driven takeup reel 42.

An electric motor 44 drives a sprocket 46 and the stripping disc 40 through a gear box 48 and a chain 50, and the disc 38 is driven by the disc 40 through gears 52 and 54 at the same rate of speed as but in a direction opposite to that in which the disc 40 is rotated. The discs are provided with peripheral grooves 56 and 58, and engage the cordage 10 therebetween. The discs are driven at the same peripheral rate of speed as the linear rate of speed at which the cordage is advanced by the capstan 15, which is driven positive through the drive of the disc 40.

One end of an actuating lever 60 mounted pivotally on a pin 62 projecting from the plate 22 is connected by a link 64 to the lever 26, and the other end thereof carries a cam follower 66 which is biased against a cam 68 carried with the disc 38. As the cam is turned to the position thereof shown in broken lines in Fig. 1, the cam follower is moved from the dotted-line position thereof to the broken-line position thereof and engages a dwell portion 70 of the cam. As the cam follower is so moved, the lever 69 moves the lever 26 and the sheaves 24 and 34 from their full-line positions to their broken-line positions. During such movement, the sheave 24 is moved farther from the sheaves 20 and 21 thereby lengthening the cordage looped around these sheaves, and simultaneously the sheave 34 is moved the same distance toward the sheaves 32 and 33 thereby shortening the cordage looped around these sheaves the same length that the cordage on the sheaves 24, 20 and 21 is lengthened.

Since the sheaves 32, 33 and 34 give up cordage stored thereby at the same rate that the sheaves 20, 21 and 24 take up cordage for storage, the rate of speed at which the cordage is advanced from the supply reel 16 to the sheave 20 and from the sheave 32 to the capstan 15 is not affected by such movement of the sheaves 24 and 34. However, these movements of the sheaves 24 and 34 are at such a rate that the sheaves 20, 21 and 24 take up additional cordage and the sheaves 32, 33 and 34 give up cordage at the same rate of speed as that at which the capstan 15 advances the cordage so that the portion of the cordage between the sheave 21 and the sheave 32 is stationary during such movements of the sheaves 24 and 34.

Figure 4:
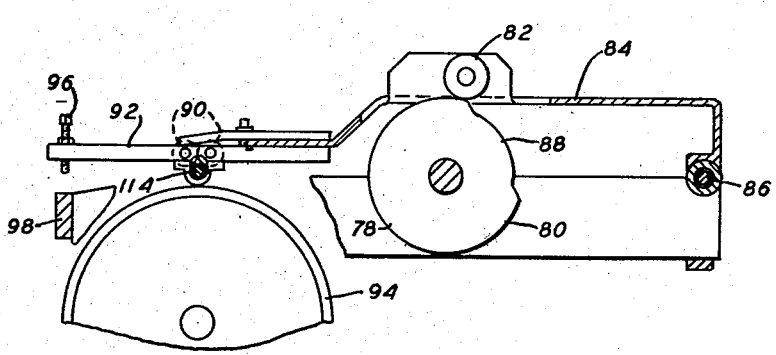
Fig. 4 is an enlarged, vertical section taken along line 4—4 of Fig. 2.
Figure 6:
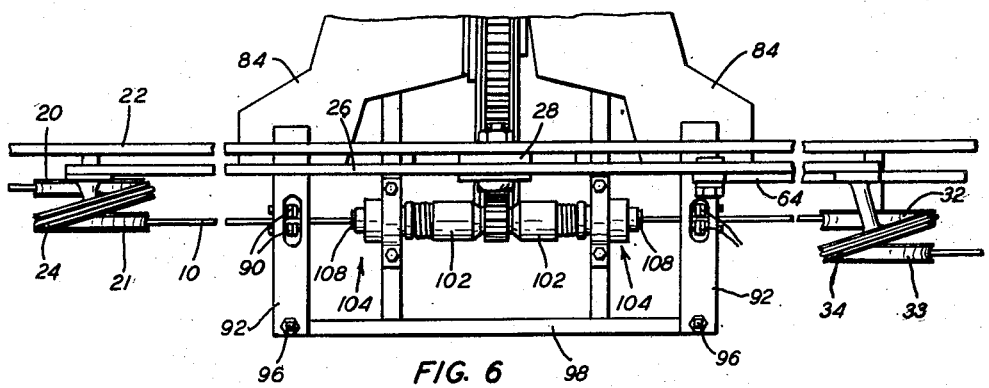
Fig. 6 is an enlarged, fragmentary, plan view taken along line 6—6 of Fig. 1.
Figure 8:
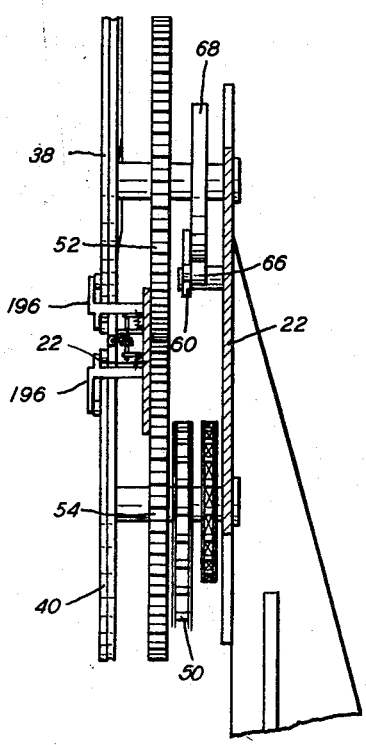
Fig. 8 is an enlarged, vertical view taken along line 8—8 of Fig. 1.

Shortly after the portion of the cordage 10 between the sheaves 21 and 32 becomes stationary, a lobe 78 of a cam 80 (Figs. 2 and 4), which is driven by the sprocket 46, of the ring cutter 30, is moved out of engagement with a cam follower 82 supporting a yoke 84 mounted pivotally on a pin 86, and a dwell portion 88 of the cam 80 is moved opposite to the follower 82. This permits the yoke to pivot by gravity in a counterclockwise direction, as viewed in Fig. 4, and pairs of grooved backing rollers 90—90 carried by arms 92—92 clamped to the yoke engage spaced portions of the cordage and press these portions of the cordage against rapidly rotating cutting discs 94—94 (Figs. 1 and 4) driven by an electric motor. The cutting discs cut into the jacket 12 of the cordage to a predetermined depth permitted by adjustment screws 96—96 and a stop bar 98, which depth is almost as great as the wall-thickness of the jacket. Adjustment as to height of the cutting discs is provided by loosenable clamping bolts 97—97 and adjustment screws 99—99 carried by the plate 22.

As the cordage 10 is pressed toward the cutting discs 94—94 by the yoke 84, cams 100—100 (Fig. 2) engaged by spring-pressed follower sleeves 102—102, which are mounted slidably on a bushing 103 of collets 104—104 are rotated by a gear 106 to positions permitting the follower sleeves to close split chuck jaws 108—108 on the portions of the cordage adjacent thereto. The jaws 108—108 then grip the cordage tightly, and the gear 106, which is driven by a shaft 110 driving the cam 80, rotates the collets through a gear 112 formed on the bushing 103. The collets then rotate the portions of the cordage engaged by the cutting discs 94—94 through somewhat over 360° so that the jacket of the cordage is cut completely around at the points engaged by the cutting discs. The cams 100—100 then actuate the collets 104—104 to release the cordage as the cam 80 moves the yoke 84 away from the cutting discs and guide loops 114—114 secured to the arms 92—92 move the cordage away from the cutting discs.

The cam 68 (Fig. 1) then causes movement of the lever 26 from its broken-line position to its full-line position, and keeps it in this position until just prior to the next ring-cutting operation, occurring almost one revolution of the cam 68 away. As the lever is moved to its full-line position, the cordage is given up by the sheaves 20, 21 and 24 and is taken up by the sheaves 32, 33 and 34 in equal lengths so that the rate of speed of the portions of the cordage to the left of the sheave 20, as viewed in Fig. 1, and to the right of the sheave 32 is unaffected.

Figure 5:
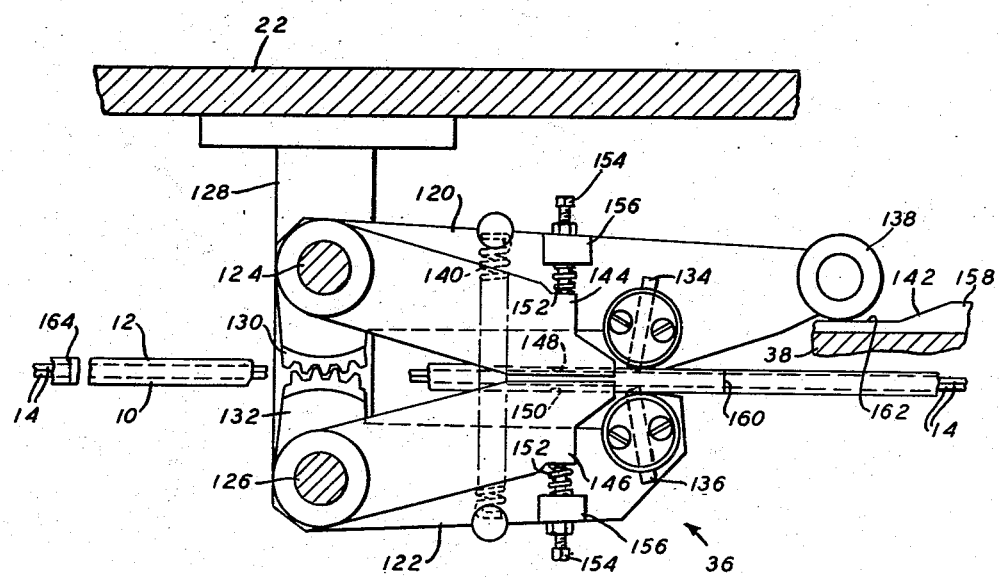
Fig. 5 is an enlarged, horizontal section taken along line 5—5 of Fig. 1.

The slitter 36 (Figs. 1 and 5) includes a pair of knife arms 120 and 122 mounted pivotally on posts 124 and 126, respectively, mounted on a bracket 128 secured to the plate 22. The arms 120 and 122 are provided with intermeshing segmental gears 130 and 132, respectively, and carry removably slitting blades 134 and 136, respectively, in positions offset therefrom, and the arm 120 carries a cam follower 138, which is biased by a spring 140 against a cam 142 fastened to the stripping disc 38. The spring 140 secured to the arms 120 and 122 urges the arms toward one another and the knives 134 and 136 toward the cordage 10 guided therebetween by guide arms 144 and 146 having grooves 148 and 150, respectively, and mounted pivotally on the posts 124 and 126. The guide arms are urged against the cordage by compression springs 152—152 mounted on adjustment screws 154—154 screwed through lugs 156—156 projecting from the knife arms 120 and 122.

While a portion of the cordage 10 not to be slit passes between the knives 134 and 136, a lobe 158 of the cam 142 engages the cam follower 138, thereby holding the knife arms in positions holding the knives 134 and 136 separated and away from the cordage. While the knives are held separate, the springs 152—152 urge the guide arms 144 against the cordage to center the cordage between the knives and keep the cordage out of contact with the knives.

As a ring cut 160 formed in the cordage 10, which is the advance one of a pair of ring cuts formed simultaneously, arrives at a position abreast the knives 134 and 136, the cam lobe 158 is moved out of engagement with the cam follower 138, and a dwell portion 162 of the cam 142 is moved abreast the follower 138. The spring 140 then closes the knife arms 120 and 122 to the extent permitted by the adjustment screws 154—154 engaging the guide arms 144 and 146, which extent is just sufficient to cause the knives 134 and 136 to cut almost completely through the jacket 12 at opposite sides thereof. The jacket then is slit from the ring cut 160 to a ring cut 164, which is the trailing ring cut of the simultaneously formed pair. As the ring cut 164 arrives at the knives, the beginning portion of the lobe 158 of the cam 142 is revolved by the disc 38 into engagement with the cam follower 138 to move the knives away from the cordage. Thus, the slitter 36 forms opposed slits in the jacket 12 of the continuously moving cordage 10 from the ring cut 160 to the ring cut 164 in synchronism with the movement of the disc 38, the operation of the ring cutter 30 and the advancement of the cordage by the capstan 15.

Figure 3:
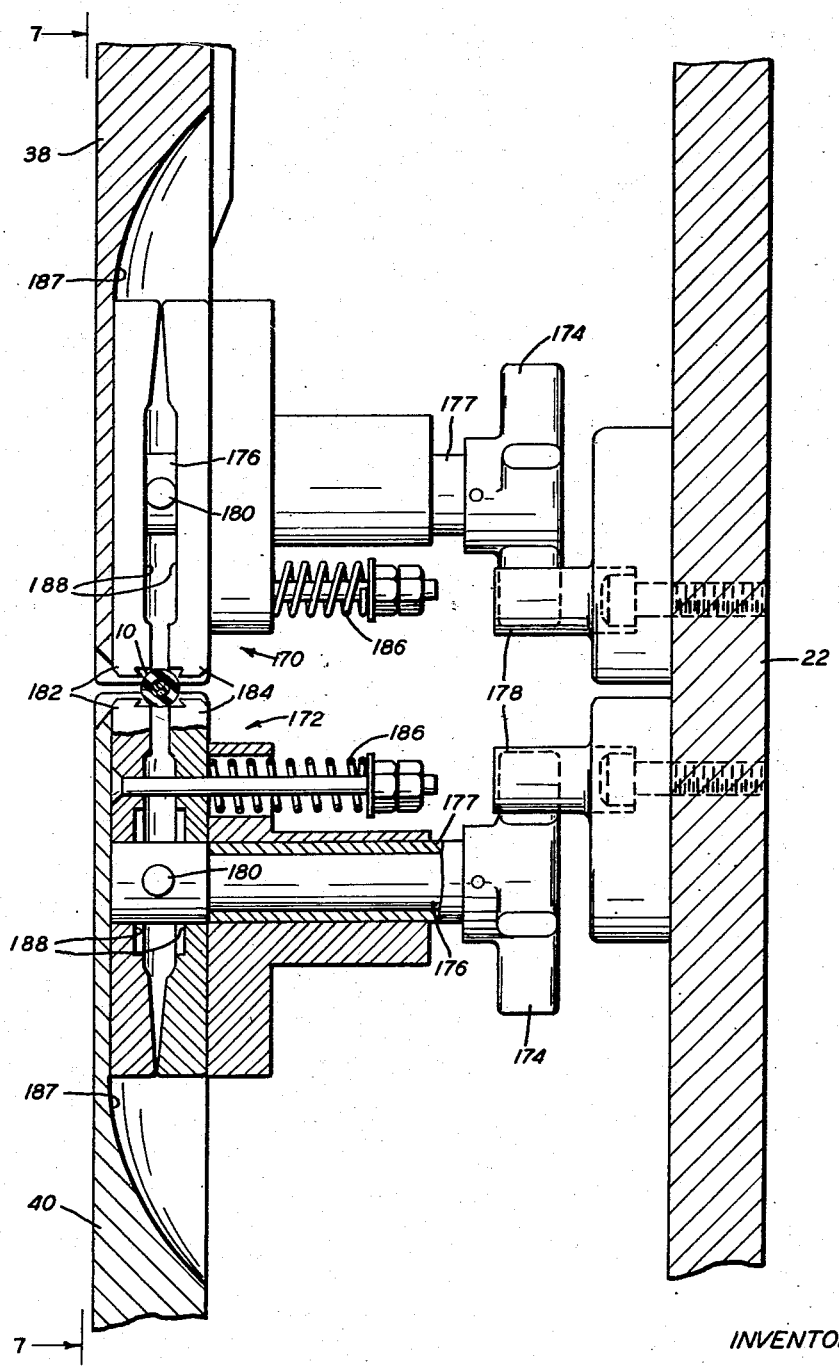
Fig. 3 is an enlarged, vertical section taken along line 3—3 of Fig. 1.
Figure 7:
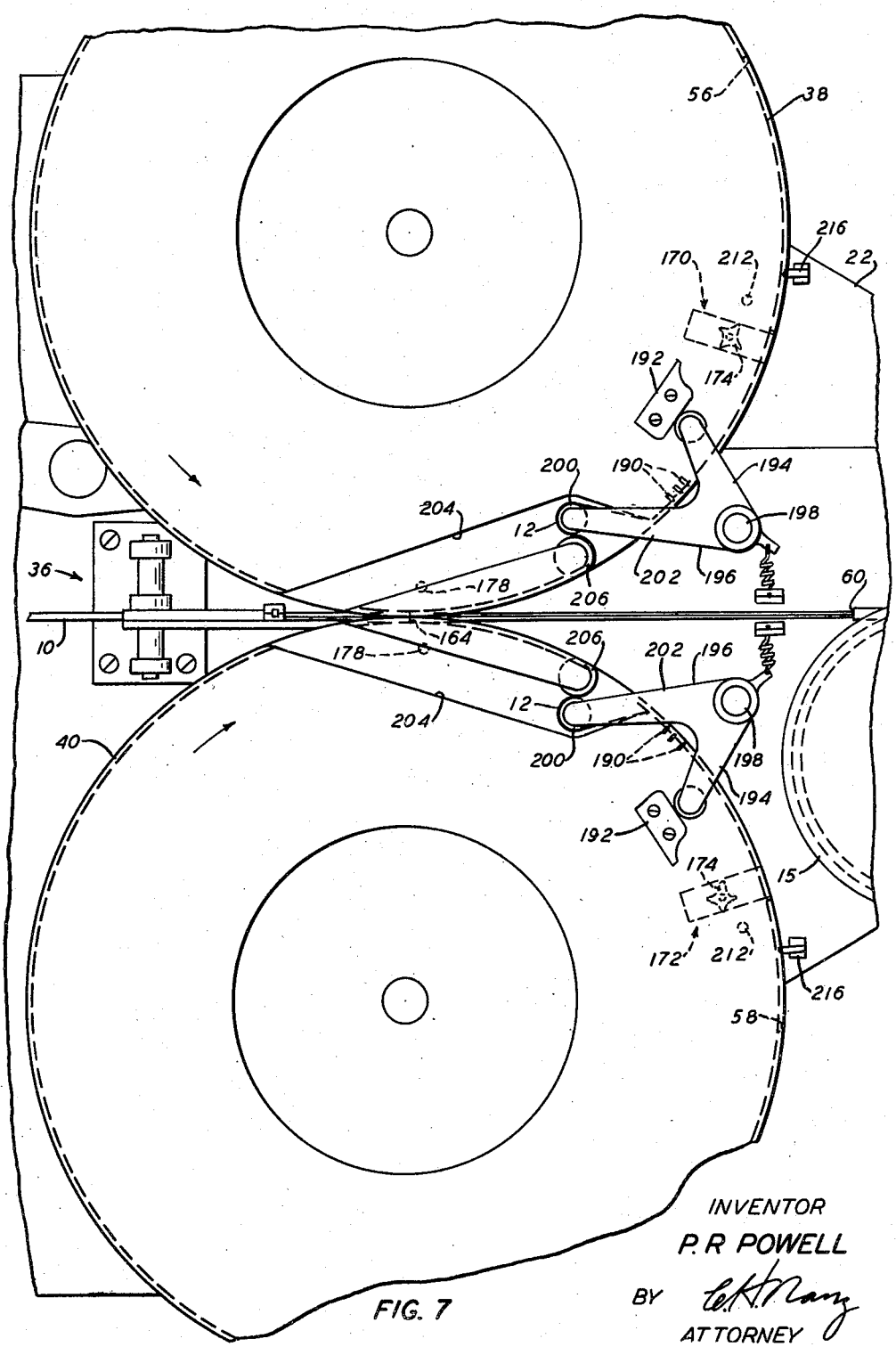
Fig. 7 is an enlarged, fragmentary front elevation of the apparatus taken along line 7—7 of Fig. 3 with elements in different positions from the positions in which they are shown in Fig. 3.

Just after the ring cut 160 is advanced to the point of tangency or bite of the stripping discs 38 and 40, grippers 170 and 172 (Figs. 1, 3 and 7) are moved into engagement with the cordage at points spaced just behind the ring cut 160. As the grippers are so moved, pinions 174—174 keyed to shafts 176—176 mounted in fixed bearings 177—177 engage pins 178—178 fastened to the plate 22, and are turned 90°. This turning of the pinions revolves pins 180—180 extending transversely to the shafts 176—176 from positions holding jaws 182—182 away from the jaws 184—184 against the actions of compression springs 186—186 to positions extending along grooves 188—188 formed in the jaws 182—182 and 184—184, and the springs 186—186 close the jaws on the portions of the jacket on opposite sides of the cordage and separated by the slits formed by the slitter 36. The jaws 182—182 and 184—184 are mounted in sockets 187—187 formed in the discs 38 and 40. The pairs of jaws 182—182 and 184—184 grip the portions of the jacket firmly, and as the discs 38 and 40 are turned, pull the gripped portions of the jacket apart along the slits and from the cordage starting with the ring cut 160 and separating along the slits in the jacket.

As the stripping discs 38 and 40 rotate, pointed pins 190—190 carried by these discs behind the grippers 170 and 172 impale the jacket 12 and aid the grippers in pulling the portions of the jacket separated by the slits apart and from the cordage. As the ring cut 164 approaches the bite of the stripping discs 38 and 40, cams 192—192 carried by the stripping discs engage arms 194—194 of bellcrank levers 196—196 mounted on posts 198—198 secured to the plate 22 to move rollers 200—200 carried by arms 202—202 of the bellcrank levers into guide grooves 204—204 formed in the stripping discs. As the rollers are so moved, they engage the stripped portions of the jacket and roll these portions into the guide grooves, thereby placing the stripped portions of the jacket under tension back to the bite of the stripping discs. Rollers 206—206 facilitate movement of the stripped portions of the jacket as these portions are stretched so that the tensile stress is transmitted along these portions to the bite of the stripping discs. As the ring cut 164 comes to the bite of the discs, the tension on the portions of the jacket being stripped break any portion of the jacket not cut completely through at the ring cut 164 so that the stripped portions of the jacket are separated completely from the cordage. Just after the stripped portions of the jacket are separated completely from the cordage, the cams 192—192 move out of engagement with the arms 194—194 of the bellcrank levers 196—196 to permit free movement of the bellcrank levers as the rollers 200—200 roll through the grooves 204—204 and are biased against the peripheries of the stripping discs by tension springs 210—210.

As the grippers 170 and 172 are rotated further, the pinions 174—174 (Fig. 3) engage pins 212—212 (Fig. 1) and are turned 90°. This turns the pins 180—180 (Fig. 3) to positions transverse to the grooves 188—188 to open the jaws 182—182 and 184—184 thereby releasing the stripped portions of the jacket. The forward ends of the stripped portions of the jacket then are moved into engagement with stripping fingers 216—216 extending to the peripheries of the stripping discs 38 and 40. The fingers 216—216 lift the stripped portions out of the grippers, off the pins 190—190 and out of the grooves 56 and 58 in the stripping discs so that the stripped portions fall off the stripping discs.

The circumference of the grooves 56 and 58 are equal and of a length equal to that of a portion of the cordage from one ring cut to the ring cut once removed therefrom. Hence, the apparatus described hereinabove strips portions of the jacket of uniform length and spaced uniformly along the cordage.

Operation

The apparatus described hereinabove advances the cordage continuously at a constant rate of speed from the supply reel 16, which is braked, to the sheave 20 and from the sheave 33, past the slitter 36 and the stripping discs 38 and 40 and around the capstan 15 to the takeup reel 42 at that rate of speed. The movement of the cordage from the sheave 21 to the sheave 32 is in cycles for each cord length of the cordage, each of which cycles includes no movement while the ring cutter 30 ring cuts the cordage, movement above the rate of speed caused by the capstan 15 after each pair of ring cuts are made and the capstan rate of speed between these two variants while the lever 26 is stationary. The sheaves 32, 33 and 34 give up cordage while the portion of the cordage between the sheaves 21 and 32 is stationary and the sheaves 20, 21 and 24 take up the cordage simultaneously with this giving up thereof. Conversely, after each pair of ring cuts is made, the sheaves 20, 21 and 24 give up length of cordage and the sheaves 32, 33 and 34 take up length of the cordage at an equal rate of speed.

While the portion of the cordage 10 between the sheaves 21 and 32 is stationary, the cam 80 (Figs. 2 and 4) actuates the yoke 84 to move the cordage into engagement with the cutting discs 94—94, and the cams 100—100 and the gear 106 actuate the collets 104—104 to grip the cordage and turn it so that it is ring cut by the cutting discs. This occurs every cord length at points spaced uniformly from the preceding and succeeding respective ring cuts.

The cordage 10 having been ring cut is advanced from the sheave 32 through the slitter 36 and between the stripping discs 38 and 40 and portions of the jacket are slit and stripped continuously.

The above-described apparatus serves to continuously advance the cordage at a high rate of speed without interruption in the paying out and taking up of the cordage while a periodic operation, ring cutting in the illustration used, requiring non-advanced cordage is effected. The walking beam storage device 23 provides periodically stationary portions of the cordage without interruptions in the advancement of the cordage.

While the ring cutter 30, the slitter 36 and the stripping elements have been described hereinabove in conjunction with the article-advancing device forming the present invention, these mechanisms have been described for purposes of illustration only and the article-advancing device obviously can be used wherever it is advantageous to have portions of a filamentary article periodically stationary and other portions thereof advanced continuously. The entire combination of the cordage-processing elements and the article-advancing device is disclosed and claimed in copending application Serial No. 77,546, filed, February 21, 1949, by J. H. Penn and P. R. Powell for "Apparatus for Processing Cordage."

In the use of the terms "filamentary article," "filament," or the like, it is intended to include cordage, twine, wire, covered conductors, tapes and the like.

What is claimed is:

1. An apparatus for advancing filaments from a storage device, which comprises a filament-supplying means, means spaced from the filament-supplying means for advancing a filament at a constant predetermined rate of speed, a group of individually rotatable guide sheaves mounted for rotation on a stationary axis, a second group of individually rotatable guide sheaves mounted for rotation on a second stationary axis spaced from and substantially parallel to the axis of rotation of the first-mentioned group of guide sheaves, a lever having arms of equal length and extending in a position offset from the groups of guide sheaves, at least one guide sheave mounted on one end of the lever, at least one guide sheave mounted on the other end of the lever so that a filament advanced from the filament-supplying means by the filament-advancing means along a path from the filament-supplying means to one of the first-mentioned group of guide sheaves, from that guide sheave to the guide sheave on the arm of the lever most adjacent thereto, from that guide sheave to another guide sheave of the first group of guide sheaves, from that guide sheave to one of the guide sheaves of the second-mentioned group of guide sheaves, from that guide sheave to the guide sheave mounted on the other arm of the lever, from that guide sheave to one of the other guide sheaves of the second-mentioned group of guide sheaves, and from that guide sheave to the filament-advancing means, and periodically operable cam means for pivoting the lever so that, when one of the guide sheaves mounted on the arms thereof is moved toward the group of guide sheaves most adjacent thereto, the guide sheave on the other arm of the lever is moved away from the other group of guide sheaves, whereby a predetermined length of the filament is taken up by one of the guide sheaves of the lever and the group of guide sheaves most adjacent thereto and is an equal length thereof given up by the other guide sheave on the lever and the group of guide sheaves most adjacent thereto.

2. Apparatus for advancing communication cordage from a supply reel through a storage device to a take-up reel, which comprises a frame positioned between the supply reel and the take-up reel, a walking beam pivotally mounted at its center on the frame, two sheaves rotatably mounted on the opposite ends of the beam, a pair of initial guide sheaves freely rotatable side by side on the frame and in alignment with one beam sheave, a pair of final guide sheaves spaced a predetermined distance from the first mentioned guide sheaves and freely rotatable side by side on the frame and in alignment with the other beam sheave, a continuously rotating capstan for withdrawing cordage from the supply reel, advancing it seriatim over one of the initial guide sheaves, over the sheave on the adjacent end of the beam, over the other initial guide sheave, to one of the final guide sheaves, over the sheave on the opposite end of the beam, over the other final guide sheave and to the take-up reel, and cam means for intermittently rocking the walking beam in opposite directions in timed relation to the advance of the cordage so that when the beam is rocked in one direction the first looped portion of the cordage is lengthened while the second looped portion thereof is shortened and when the beam is rocked in the opposite direction the first looped portion of the cordage is shortened while the second looped portion thereof is lengthened, whereby a portion of the cordage remains stationary while the remainder of the cordage is moving.

PAUL R. POWELL.

References Cited in the file of this patent

UNITED STATES PATENTS

| Number | Name | Date |
|---|---|---|
| 439,723 | Cox | Nov. 4, 1890 |
| 557,907 | Southgate | Apr. 7, 1896 |
| 590,604 | Wood | Sept. 28, 1897 |
| 811,270 | Bechman | Jan. 30, 1906 |
| 889,746 | Bechman | June 2, 1908 |

FOREIGN PATENTS

| Number | Country | Date |
|---|---|---|
| 552,003 | Great Britain | Mar. 18, 1943 |